Nov. 10, 1970     W. E. FRANK     3,538,626
STUDENT-RESPONDER APPARATUS
Filed Feb. 16, 1968     6 Sheets-Sheet 1
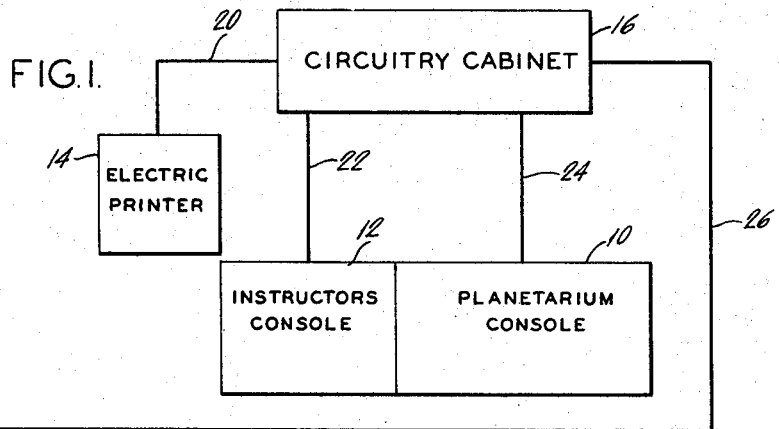
FIG. 1.
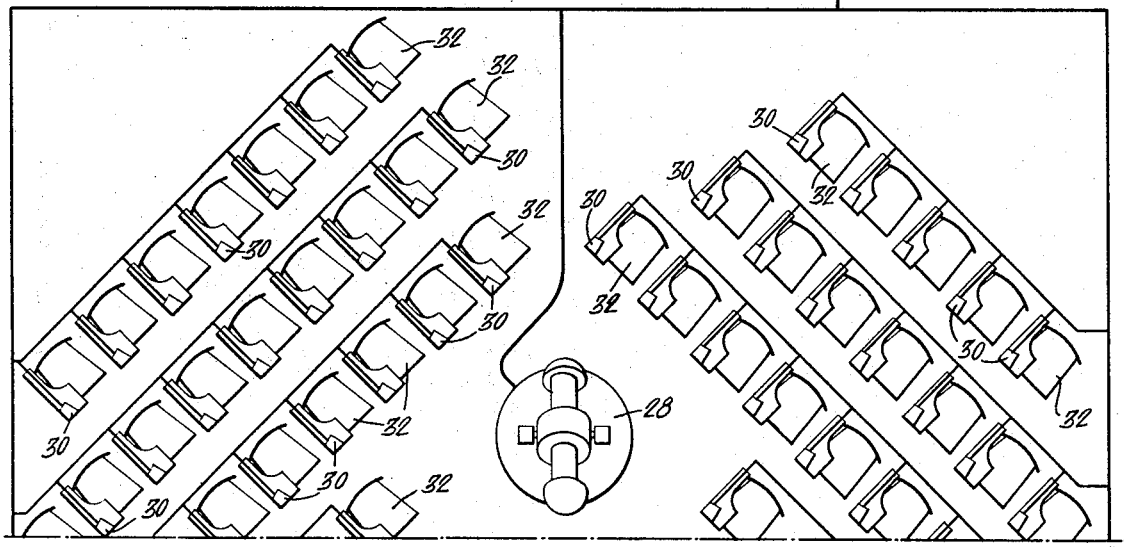
FIG. 2.
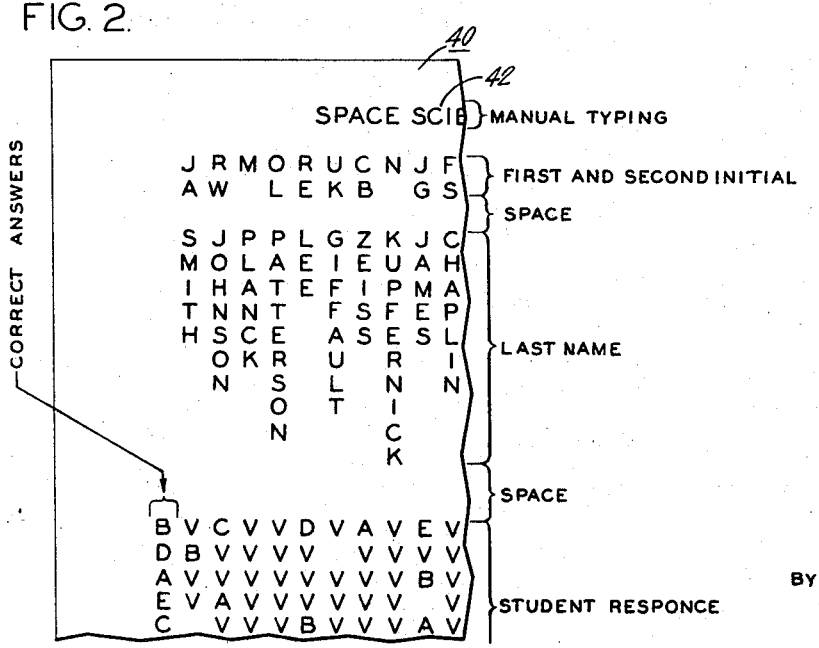
INVENTOR:
WALLACE E. FRANK
BY Howson & Howson
ATTYS.

Nov. 10, 1970  W. E. FRANK  3,538,626
STUDENT-RESPONDER APPARATUS
Filed Feb. 16, 1968  6 Sheets-Sheet 6

INVENTOR:
WALLACE E. FRANK
BY Howson & Howson
ATTYS.

United States Patent Office 3,538,626
Patented Nov. 10, 1970

3,538,626
STUDENT-RESPONDER APPARATUS
Wallace E. Frank, Westtown, Pa., assignor, by mesne assignments, to Response Systems Corporation, Media, Pa., a corporation of Pennsylvania
Filed Feb. 16, 1968, Ser. No. 705,967
Int. Cl. G09b 5/00
U.S. Cl. 35—48                          6 Claims

ABSTRACT OF THE DISCLOSURE

A student-responder system of the type comprising an instructor's console and a plurality of student-responder units connected to the console, the responder units having switch are operated by the students to indicate their responses to questions, these responses being automatically recorded. An alphabet selector is provided in each responder unit by means of which each student can spell out his name and cause it to be recorded adjacent the records of his responses. The alphabet selector may be an alphabetized wheel which the student turns successively to the successive letters of his name. The corresponding successive positions of the wheel are encoded in parallel binary digital form and read out, letter by letter, by operation of a sequencer which sequentially interrogates all of the student responder units. The resultant serial read-out signal is supplied to an electric printer in such manner that the successive letters of the names of each student are printed in the same column as are his responser. By operation of appropriate switches, the same coincidence or AND circuits utilized for read-out of student responses may be used for read-out of name-letter data, and a single line used to transmit both response data and name data from each responder to the recording apparatus.

BACKGROUND OF THE INVENTION

Student responder systems are known in the prior art in which an instructor's console is interconnected with each of a plurality of remote student-responder units, each responder unit having a plurality of switches which are operated by each student to transmit to the instructor's console his answers to questions. If only true or false responses are to be indicated, one or two switches are sufficient at each responder unit, while for multiple-choice answers five such switches would be appropriate to enable selection from among five possible responses.

The responses may be displayed at the instructor's console, for example by an array of lamps each associated with a different student, the illumination of any lamp indicating a correct response from the corresponding student. Appropriate meters may be used to display the number of students who select each of the several available responses to a given question. By means of such apparatus the instructor is able to receive an impression of his success in conveying ideas to the student group, by asking a question and observing the pattern of responses substantially immediately, without having to receive an oral answer from each of the students successively is might otherwise be necessary; in addition, each student's answer is private so as not to affect the answers of other students.

For the purposes of more leisurely and detailed analysis, the responses of each student may be automatically recorded by an electric printer, or teletypewriter, supplied with electrical signals from each of the student-responder units. The responses from the responder units may be recorded in different groups or sets, one for each responder unit, by appropriate coordination of the recording apparatus with the interrogating signals which are sent out from the instructor's console to the student responder units to read out the state of the switches in the various units.

In order to identify which groups of responses were received from which students, it is possible to arrange the timing of the system such that a given group of response records is always produced by a given responder unit. By making a list of the students assigned to the various responder units it is then possible to identify the responses with a particular student. However, such a clerical correlating procedure is inconvenient and time-consuming, and involves the possibility of human error. This is particularly true, for example, in an application such as a planetarium lecture where each listening group may be entirely different from the last, and completely unknown to the instructor.

SUMMARY OF THE INVENTION

In accordance with the invention, there is provided a student-responder system comprising a plurality of student stations each having student-operable controls for producing signals indicative of student responses, recording means supplied wtih said response-indicating signals for producing records of said signals on a recording medium, and means controlled from each of said stations for producing records on said medium of the names of students at said stations. Preferably the student's names are recorded in positions associated with the records of their responses. In this way positive identification of responses with a given student is provided.

To accomplish this, preferably each student station comprises a student-responder unit having a manually-operable alphabetical character provided with visible letters of the alphabet thereon and adjustable by the student to select the successive letters of his name for recording. The position of the selector is encoded to produce a different electrical signal for each letter-setting of the selector. Preferably the encoding is in binary digital form, so that five electrical connections are sufficient to represent all of the letters of the alphabet. Preferably also, each student first selects the letter which is first in his name, and the corresponding encoded signals from all students are transmitted to the recording means to produce records of the first letters of all of the names. Each student then selects the second letter of his name, which is then automatically recorded, and the process repeated until all names have been completed. By operating in this manner the recording means can be easily controlled to produce records of the successive letters in each student's name in a column aligned with records of his responses.

In one preferred embodiment, the encoded letter-representing signals in each responder unit are produced in parallel binary digital form, and means are provided for reading out, sequentially and automatically, first the stored letter-representing data in the first responder unit, then the corresponding data in the second responder unit, and so on. In this way the letter-representing signals from each responder unit are presented in serial pulse form on a single output line for transmission to the recording means, thereby minimizing the number of interconnecting leads required in the system. Furthermore, additional simplification in equipment is preferably provided by utilizing student response-indicating circuitry in the responder units which also stores the student responses in parallel form, and is also interrogated sequentially, so that the same lines used to read out the response information can be utilized to read out the name data, thereby further reducing the number of interconnecting lines required. Preferably also, the read-out for each responder comprises AND circuits which are used in common both for response read-out and name-letter read out, and the same output line from each responder unit is utilized to transmit both the response data and the letter data.

Accordingly there is provided new and useful student-responder apparatus which automatically records the names of students in association with records of their responses to questions, and which is simple in form and easy to operate. For example, it enables a planetarium instructor to present the teacher of a visiting class, at the end of the lecture, with a sheet of paper having the names of the students printed thereon adjacent records of the responses which they made to questions posed during the lecture.

BRIEF DESCRIPTION OF THE FIGURES

These and other objects and features of the invention will be more readily understood from a consideration of the following detailed description, taken together with the accompanying drawings, in which:

FIG. 1 is a schematic view of a typical arrangement of a planetarium installation incorporating the apparatus of the invention;

FIG. 2 is a plan view of a sheet of paper bearing printed records of student's names and associated student responses, such as may be produced by apparatus of the invention;

DESCRIPTION OF THE PREFERRED EMBODIMENTS

Figure 3:
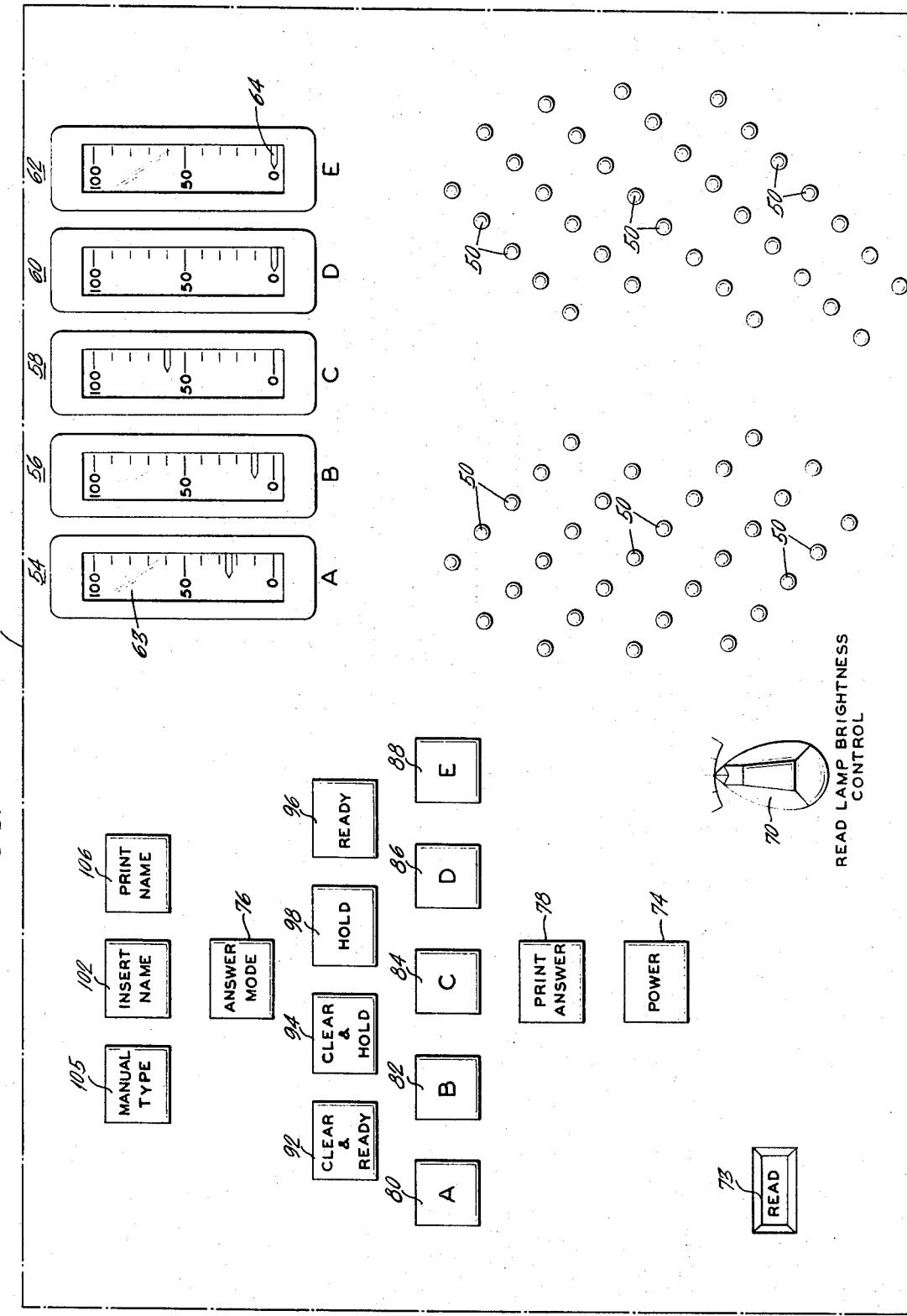
FIG. 3 is a plan view of the top of the instructor's console shown in FIG. 1.

Referring now to that embodiment of the invention which is illustrated in the drawings by way of example only, FIG. 1 illustrates schematically a planetarium installation in which the invention may be utilized. A standard planetarium console 10 is positioned adjacent an instructor's console 12 which contains controls and displays for the student-responder system, and an electric printer 14 is positioned adjacent the instructor's console and serves to print out names and responses of the students. A circuitry cabinet 16 is mounted in any convenient location, and contains that circuitry of the responder system which is not mounted on the underside of the instructor's console and not in the electric printer or in the individual responder units. The printer 14 is connected to the circuitry cabinet by an electrical cable 20, and the instructor's console is connected to the circuitry cabinet by an electrical cable 22. A cable 24 similarly connects the planetarium console to the circuitry cabinet.

Electrical cable 26 from circuitry cabinet 16 is connected to the planetarium instrument 28 to provide usual planetarium operations, and also contains branches leading to each student-responder unit such as 30, the student-responder units being mounted one on each writing arm of each student's chair; the latter chairs are indicated as 32 in the drawing, and in this case arranged so that the students may observe the planetarium instrument 28 as well as the dome on which the planetarium images are projected.

In this application the purpose of the student-responder equipment is to enable the instructor to ask the students questions, either orally or by means of printed sheets distributed to the students ahead of time, and to produce both a temporary visual display and a permanent record of the responses of the students to the questions. In addition, in accordance with the invention, each responder unit and its associated circuitry includes apparatus enabling each student to produce a printed record of his name adjacent the records of his responses which are produced by electric printer 14.

FIG. 2 illustrates one type of printed record which can be made by the apparatus shown generally in FIG. 1 and in detail in the other figures. A sheet of paper 40 is shown on which printing has been effected by the electric printer 14. At the top is a heading 42 which may be applied by manual typing on a manual keyboard of the electric printer 14, and which may contain such information as the name of the course, the date and the instructor. The remainder of the characters are automatically printed by the operation of the system. In this example it is assumed that the questions being asked are of the multiple-choice type to which the student may give any of five answers A, B, C, D or E. In this example correct answers are indicated by V and wrong answers are indicated by the letter selected by the student, although in simple forms of the apparatus the correct answers may be indicated by printing of the correct letter, rather than a V.

A typical set of student responses is shown at the bottom of the sheet of paper in FIG. 2. The first column at the left shows the correct responses for each of five successive question, reading from the top down, and is produced by operation of switches on the instructor's console. The first horizontal row shows the responses to that same question made by the various students. Each vertical column, except for the first, therefore represents the responses of one particular student to the several questions. Above each column, typed vertically, are the first and second initials and the last names of the student whose responses are recorded below in the same column.

As will be described in detail hereinafter, the name letters and the response letters are in this example produced by the printing head in the electric printer 14 as it moves stepwise automatically, with respect to the paper sheet 40, first from extreme left to extreme right along the top horizontal row, after which it is automatically spaced downwardly one space and returned to the extreme left to print the second horizontal row, and so on. Extra vertical space between initials and last name is provided by the instructor's operation of a manual vertical-space key on the printer.

FIG. 3 shows the top of a typical instructor's console for the responder system, the right-hand half of which contains visual display apparatus and the left-hand half of which contains various control switches. More particularly, the lower-right quarter of the console comprises an array of electric lamps such as 50, which are arranged in the same pattern as are the student chairs carrying the responder units as viewed by the instructor from his position at the console. Each lamp therefore corresponds to the correspondingly-positioned student-responder unit, and indicates by its brightness the nature of the response made by the student. In this way, the instructor viewing the lamp array may observe the nature of the response from a particular responder unit and then readily identify the chair and the student from which the response came. Typically, any given lamp will light up brightly if the corresponding student has made the correct response, will remain dark if the student makes no response, and will be only dimly lighted if the student makes an incorrect response.

The upper-right quarter of the instructor's console contains five meters 54, 56, 58, 60 and 62 which indicate, respectively, the number of students who have made the response A, B, C, D or E, to a given question. In the form shown, each meter comprises a graduated transparent window such as 63 bearing a scale indicating numbers of students, and a moving pointer such as 64 which automatically moves to a position on the scale indicating the number of students who have made the response A, B, C, D or E associated with the particular meter.

Referring to the left side of FIG. 3, the square blocks are momentary-contact switch buttons bearing the markings shown. Some of the switch buttons momentarily close a corresponding switch when momentarily close a corresponding switch when momentarily depressed, while others are connected to bistable circuits such that the associated switches are closed by momentary depression of the button and remain closed until opened by the next depression of the button; these two types of switch buttons will be designated herein, for convenience, as single-acting and double-acting, respectively.

Figure 4:
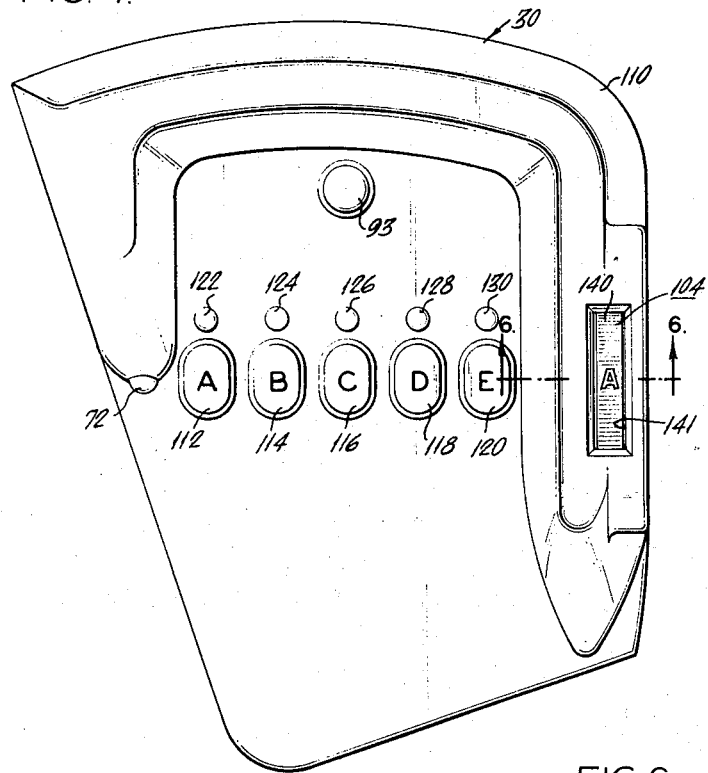
FIG. 4 is a plan view of a student-responder constructed in accordance with the invention.

More particularly, in FIG. 3 there is shown a read-lamp brightness control knob 70 which enables the operator to adjust the brightness of reading lights at each of the student-responder units so that, when desired, the students can see to perform tasks at their seats in a darkened planetarium; such a reading lamp is shown, for example, at 72 of FIG. 4. Another such lamp 73 is located on the console so the instructor may observe the degree of "read" light illuminations being provided. Double-acting power-switch button 74 enables the instructor to turn on and off all supply power for the entire student responder system. "Print Answer" switch button 78 causes electric printer 14 to print-out student responses stored in the responders, provided the "Answer Mode" switch button 76 has been actuated to place the apparatus in the condition for processing student responses. Switch buttons 80, 82, 84, 86 and 88, labeled respectively A, B, C, D and E, are "correct-answer" controls; the instructor presses the proper one of these buttons corresponding to the correct answer to his last question, and thus provides electrical information for operating the visual display lamps 50 and the meters 54–62, and for printing the correct answer in the first column of the answer sheet 40.

Operation of "Clear and Ready" switch button 92 operates to clear all of the student responders of stored responses to the previous question, turns on a "ready" light (93 in FIG. 4) at each responder unit indicating that the responder unit is prepared to receive the next student response, and also clears the system of the previously stored "correct answer" data produced by the instructor's operation of one of buttons 80–88. "Clear and Hold" switch button 94 operates similarly to the "Clear and Ready" button except that it holds the student-responder units inoperative, and puts out the "ready" lights, to prevent the insertion of new response information in the responder units until the instructor operates the ready switch 96, which again enables each of the responder units to receive and store student responses. The "Hold" switch button 98 enables the instructor to hold the responder units inoperative without, however, clearing them, in which condition they will remain until the 'Ready" switch 96 is operated. The "hold" operations assist the instructor in keeping the attention of the students while he talks to them, since it will be pointless for them to manipulate their controls during any "hold" period.

The "Answer Mode" switch button 76 and the "Insert Name" switch button 102 enable the operator to switch between the mode in which the equipment is adapted to receive, display and print student responses (the answer mode) and the mode in which the equipment is adapted to receive and print the letters of the student's names (insert-name mode). When the "Insert Name" switch button 102 is operated, all of the previously-described control operations (with the exception of power switching and read-light control) are locked out, while the equipment is made ready to receive name information.

Figure 5:
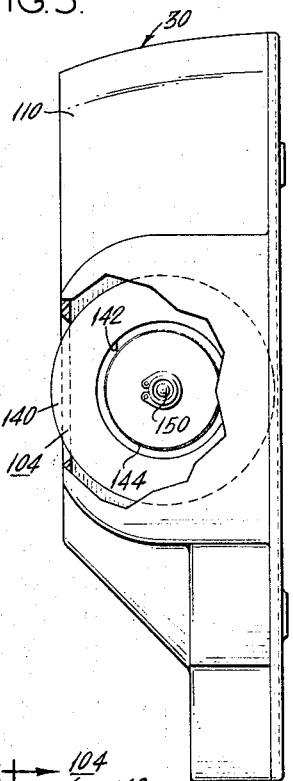
FIG. 5 is a side view of the responder of FIG. 4.
Figure 7:
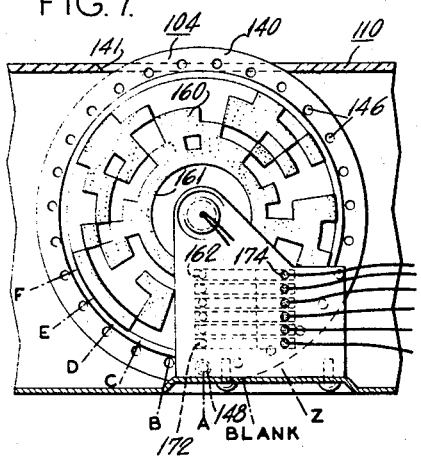
FIG. 7 is a sectional view taken along lines 7—7 of FIG. 6.
Figure 6:
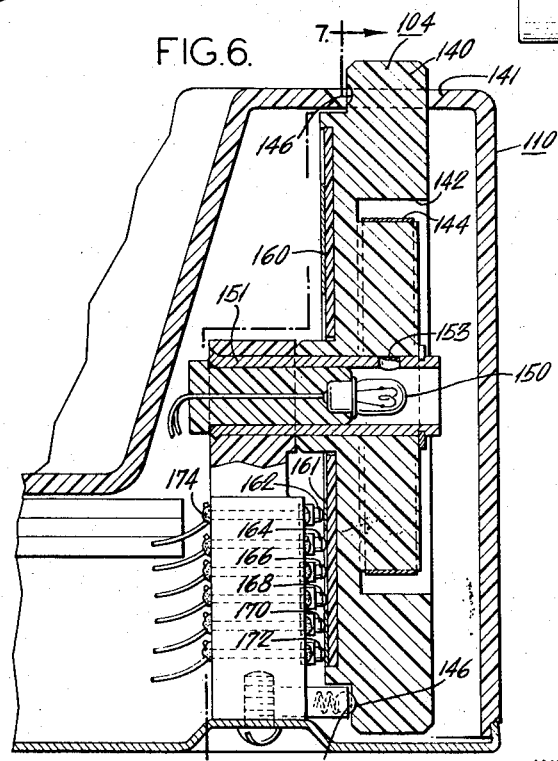
FIG. 6 is a sectional view taken along lines 6—6 of FIG. 4.
Figure 8:
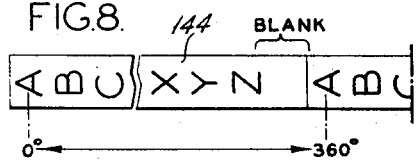
FIG. 8 is a development, over slightly more than 360°, of a strip of letter-bearing material used in the responder of FIGS. 4–7 to provide visible alphabetical character indicia visible to the student, for his use in producing a record of his name.

To utilize the equipment in the name mode, the "Insert-Name" switch button 102 is operated, and the instructor asks each student to use the alphabet selector 104 of FIG. 5 to select the first letter of his name. When all students have done this, the instructor actuates the "Print Name" switch 106, which automatically reads out the letter information stored in the student responder units, causes it to be printed by the electric printer 14, and returns the electrical circuits to the condition for receiving data as to the next name letter. The instructor then calls for the next letter of the students names and the process is repeated, until all names have been fully spelled out and printed. As will be described more fully later herein, the alphabet selector 104 is provided with an inactive position to which it is returned by students with short names when they have finished spelling their name, while the other students continue with their spelling. Operation of "Manual Type" button 105 enables the instructor to type in characters or spaces on the printout sheet by means of a manual keyboard at the printer.

Referring now to FIGS. 4, 5, 6, 7 and 8, the form of student responder shown therein by way of example comprises an outer casing 110 secured to the writing arm of each student's chair. On it are mounted the reading lamp 72, the "ready" light 93, and the alphabet selector 104 previously referred to. In addition it contains a row of five momentary-contact pressure switches 112, 114, 116, 118 and 120 associated with the answers A, B, C, D and E, respectively. By momentarily pressing a particular one of the switches the student selects his response from the choices A, B, C, D or E. This selection is effective only when the "ready" light 93 is illuminated. Also on the top surface of the responder unit are lamps 122, 124, 126, 128 and 130, aligned respectively with switches 112 through 120. When a student response has been properly inserted into the equipment by actuation of one of the pressure switches, the corresponding one of the lamps 122 through 130 becomes, and remains, illuminated until the student changes his answer or the responder is cleared by the operation of the "clear and ready" or "clear and hold" switch buttons at the instructor's console.

The alphabet selector arrangement shown represents only one of many forms of apparatus which may be utilized to encode selected letters of the alphabet in electrical form. In the form shown it comprises a clear plastic wheel 140 having its axis horizontal and its outer knurled edge protruding slightly above the surface of the responder casing, by way of an aperture 141 in the casing. This enables the student to turn the disc to any desired position. An annular concentric groove 142 is provided in the outer side face of wheel 140, on the radially-inward surface of which groove there is cemented an indicia-bearing circuit strip 144. This strip may be of paper or thin plastic having printed thereon, along its circumference, the letters of the alphabet, with a blank space between the Z and A, the letters being equally spaced from each other. The inner side of the wheel is provided with one detent, such as 146, for each of the letters and for the blank space, making a total of 27 detents. A corresponding spring-loaded ball 148, mounted from the casing 110, registers with these detents so as to provide positive positioning of the disc for each letter position. An electric lamp 150 is mounted within a hollow bushing 151 on which the wheel turns, in alignment with an aperture 153 in the top of the bushing. The strip 144 is preferably translucent except for the letters, or may be opaque with the letter translucent. Lamp 150 therefore provides rear illumination for the strip, so that one letter at a time is visible to the student looking downwardly through the clear plastic of wheel 140 from above the responder unit.

The opposite side of wheel 140 is provided with an analog-to-digital coding pattern 160 consisting of electrically-conductive material arranged such that there are 27 different, angularly-spaced, radially-extending patterns of conductive material, one of which is entirely free of such material, and all others of which are electrically interconnected. The radially-innermost portion of the pattern comprises a complete ring of material 161. Six resiliently-mounted conductive brush contacts 162, 164, 166, 168, 170 and 172 are mounted from the responder casing along a fixed radius of the wheel 140 in such fashion as to contact the coding pattern at six positions spaced equally along the wheel radius. The innermost contact 162 bears against the continuous ring of conductive material 161 at the inner edge of the coding pattern, and supplies a fixed bias voltage thereto by way of connection 174, which is communicated to all portions of the conductive pattern when the equipment is operating in the "name" mode.

Accordingly, for each different position of the wheel 140 corresponding to each different visible letter of the alphabet, a different combination of the contacts 164 through 172 is provided with voltage; when the blank space on the strip 144 is presented to view, no voltage is present at any of the five contacts. The sets of voltages at the five contacts therefore represent, in binary digital parallel form, the particular letter selected by the student, and the encoder can be effectively turned off by the student by turning wheel 140 to the position where no letter is visible to him.

Figure 9:
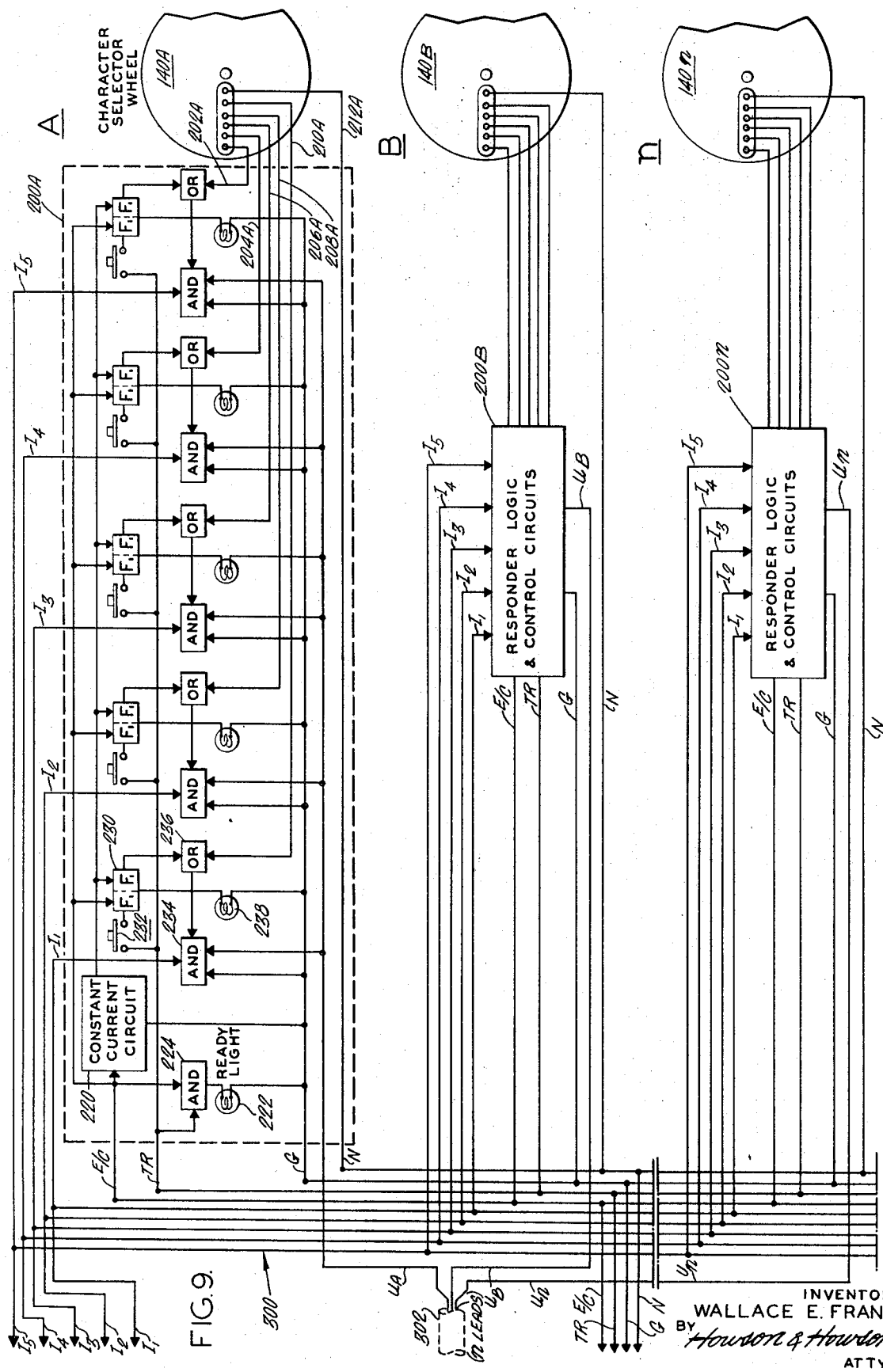
FIGS. 9 and 10 are schematic electrical diagrams, principally in block form, together illustrating one possible form of circuitry suitable for use in the apparatus of the invention.

Referring now to FIG. 9, there is shown merely by way of example one form of logic circuitry which may be utilized in the responder units. Only three such responder units are represented in FIG. 9, but all may be identical. The responders shown at A and B of FIG. 9 represent the first two responder units along the interconnectiong cable, and the responder shown at n represents any of the other identical responder circuits, such as the last one on the cable. The alphabet selector wheels for the three responder units are shown at 140A, 140B, and 140n. Since the circuitry in all responders is the same, only that shown at A of FIG. 9 need be described in detail. Thus it will be understood that the responder logic and control circuits within the dotted rectangle 200A are the same as in the corresponding elements 200B and 200n. It will also be understood that the six leads 202A, 204A, 206A, 208A, 210A and 212A, connected respectively to encoder brush contacts 172, 170, 168, 166, 164 and 162, have counterpart connections in all of the other responder units.

Referring to the responder circuit at A of FIG. 9, it will be seen that it consists of a constant-current circuit 220, a "ready" light 222, an associated AND circuit 224, and a series of five other identical circuits, each comprising a flip-flop circuit, a manually-operable momentary-contact push-button switch, an AND circuit, an OR circuit, an indicator lamp and appropriate interconnecting circuitry. For example, in the first such interative circuit the flip-flop is indicated as 230, the push-button switch is 232, the AND circuit is 234, the OR circuit is 236 and the lamp is 238. One specific form for each of the circuit eleemnts above-enumerated is shown in detail in FIG. 11, which, therefore, discloses a particular form of circuitry suitable for use in each of the responder units.

Figure 11:
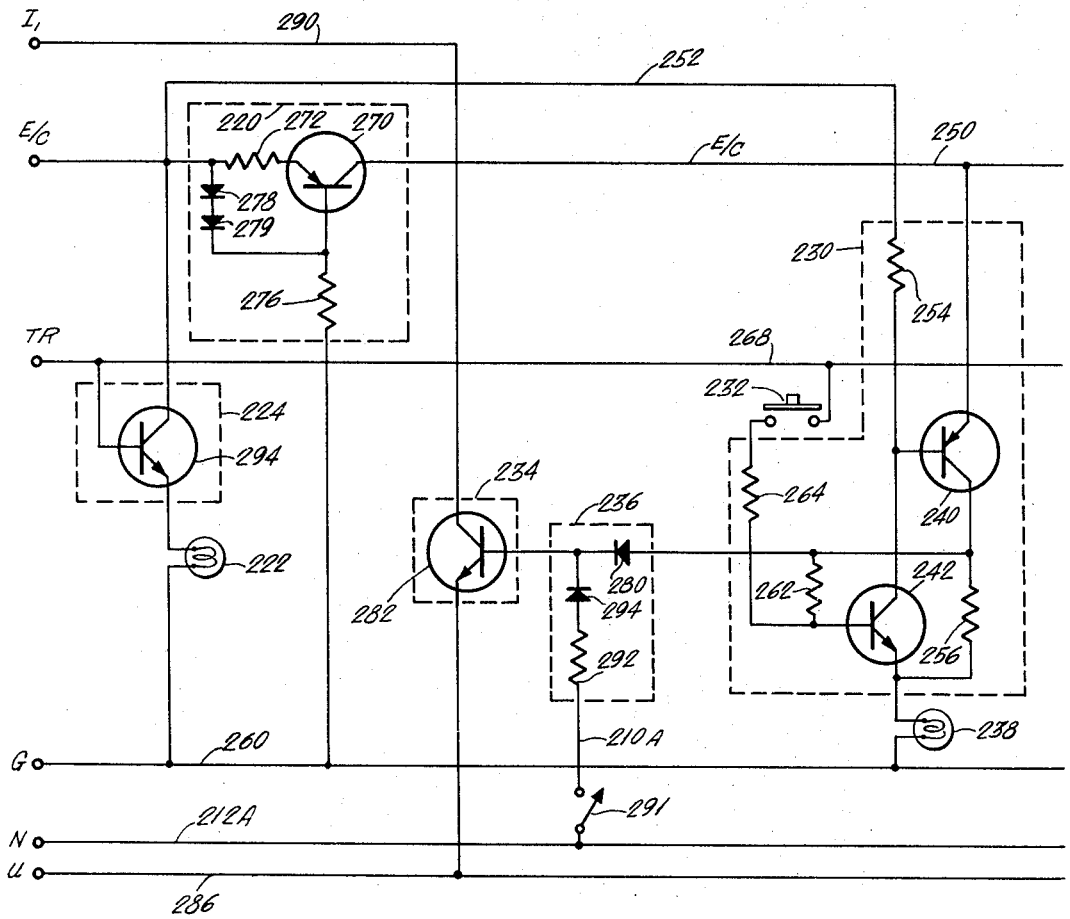
FIG. 11 is a schematic electrical diagram showing one possible specific form of circuitry for use in the apparatus shown in FIG. 9.

Referring to FIG. 11, in which parts corresponding to those in FIG. 9 are indicated by corresponding numerals, the flip-flop 230 is a bistable device utilizing a PNP transistor 240 and a NPN transistor 242, both of which are strongly conducting in one stable state of the flip-flop and both of which are substantially non-conducting in the opposite state of the flip-flop. The emitter of transistor 240 is supplied with positive voltage from line 250, and the collector of transistor 242 is supplied with positive voltage from line 252 by way of resistor 254. The base of transistor 240 is connected to the lower end of resistor 254, and the collector of transistor 240 is connected by way of resistor 256 and lamp 238 to ground lead 260. The emitter of transistor 242 is also connected to ground through lamp 238; its base is connected through resistor 262 to the collector of transistor 240, and is also connected through resistor 264 to one contact of momentary-contact switch 232, the other contact of which switch is connected to a positive supply line 268.

The flip-flop 230 is so onstructed that if either or both of the positive voltages on lines 250 and 252 are removed and then reapplied while switch 232 is open, the flip-flop will assume its normally-off conduction state and lamp 238 will be off. However, if switch 232 is momentarily operated by the student while positive voltages are applied to lines 250 and 252, as well as to line 268, the large positive voltage thereby applied to the base of transistor 242 turns on the latter transistor, which in turn causes transistor 240 to become conductive and to hold transistor 242 in its highly-conductive condition; in this manner the flip-flop is actuated to its ON state by momentary operation of switch 232; lamp 238 lights under these conditions. It will be understood that switch 232 corresponds to one of the switches operated by the student buttons, such as 112 in FIG. 4, and lamp 238 correpsonds to one of the lamps such as 122 in the latter figure.

It is noted that line 250 is supplied with positive voltage by way of the emitter-collector path of a transistor 270 having small-valued resistor 272 in series with its emitter. The base of transistor 270 is connected to ground lead 260 by way of a bias resistor 276, and a pair of forwardly-biased diodes 278 and 279 are connected between the external end of resistor 272 and the base of transistor 270 to provide operating bias. Circuit 220 provides the function of passing a limited, substantially-constant current to line 250. Accordingly, if push-button 232 is operated while another flip-flop in the same responder is in its high conduction state, the current drawn from lead 250 through the flip-flop 230 is so great as to "rob" the other ON transistor of its operating current, and cause it to resume its normal OFF state. Upon release of switch 232, flip-flop 230 then remains in its ON state. Accordingly, the student can only operate one of the five flip-flops to its ON state at any given time.

The collector of transistor 240 is also directly connected to the anode of an isolating diode 280 in OR circuit 236, and thence to the base of an NPN transistor 282 which comprises the AND circuit 234. Transistor 282 has its emitter directly connected to an output line 286 and its collector directly connected to an interrogate or read-out line 290 to which positive voltages are applied during certain operations of the equipment.

It is noted that current will flow into line 286 from transistor 282 only when positive voltages are applied to both the collector and base elements thereof. In the normally-off condition of flip-flop 230, no such positive voltage is applied by way of diode 280; however, when flip-flop 230 is actuated by student operation of a response button, the voltage at the collector of transistor 240 rises sufficiently to render transistor 282 conductive, provided a positive voltage is also then present on its collector lead 290. Accordingly, the conduction state of flip-flop 230 can be read out as a current on lead 286 by applying positive voltage to line 290, which produces current in line 286 only if flip-flop 230 is in its high-conduction state.

However, AND gate 234 can also be operated by voltages from the alphabet selector wheel 140A. In FIG. 11, the line 212A represents the corresponding line of FIG. 9 which supplies positive voltage to the alphabet selector wheel, switch arm 291 represents the switching action provided by the coding pattern on the selector wheel, and lead 210A corresponds to the similarly-numbered brush contact lead in FIG. 9. When the selector wheel is turned to a position for which switch 291 is closed, a positive voltage is applied through current-limiting resistor 292 and isolation diode 294 to the base of transistor 282. Accordingly, the presence of a voltage on brush contact lead 210A can be read out in the form of current on output line 286 by applying a positive voltage to the collector supply line 290 for transistor 282.

OR circuit 236 therefore supplies either the flip-flop output or the selector-wheel brush contact output to the AND circuit 234, and thereby enables read-out on line 286 of either the student response or the selector-wheel position signal.

Line 290 is supplied with its voltage from cable lead $I_1$ whenever read-out onto line 286 is desired. Line 286 is connected directly to cable line U, the ground line 260 is connected to the cable line G, and the selector-wheel supply 212A is connected to cable line N. The positive input voltage to the constant-current circuit 220 and to line 252 is from cable lead E/C, while that to push-button supply line 268 is supplied from cable line TR. As will become more apparent hereinafter, removal of voltage from cable line E/C is used to clear all of the flip-flops and to return them to their normal OFF conditions, and removal of voltage from cable line TR renders inoperative the students' push-button switches such as 232 to provide a "hold" operation. Removal of voltage from cable line N inactivates the alphabet-selector wheel system and prevents application of selector-wheel voltages to the AND circuits such as 234.

The AND circuit 224 consists of an NPN transistor 294 having its collector connected to the E/C supply line, its base connected to the TR supply line and its emitter connected to the ground line G by way of the "ready" lamp 222. Transistor 294 conducts only when positive voltage is applied to both its base and collector, and therefore the "ready" lamp 222 is lit only when positive voltages are present on both the E/C and the TR lines, thereby indicating that proper operating biases are being applied to the flip-flops and the responder is ready for student operation.

Referring again now to FIG. 9, it will be seen that each of the read-out AND circuits such as 234 in each responder is supplied with a different interrogate or read-out voltage from separate lines designated $I_1$, $I_2$, $I_3$, $I_4$ and $I_5$. All of the flip-flops are supplied with operating voltages from the same E/C and TR lines (250 and 268 of FIG. 11), all are connected to the same ground line G, and all flip-flops in a given responder are read out into a line unique to that responder, such as $U_A$, $U_B$ ... $U_n$.

Figure 10:
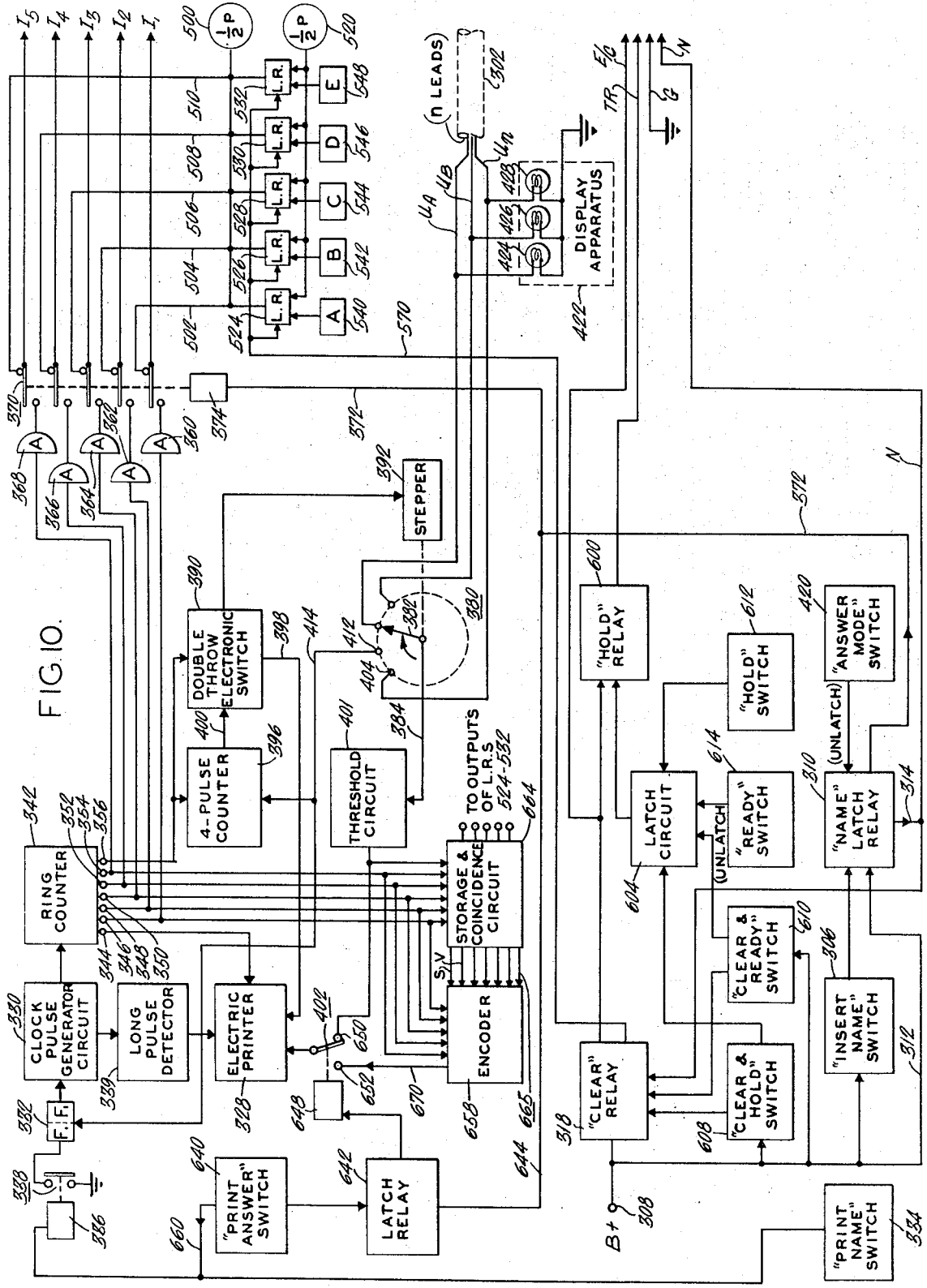

Accordingly, the cable 300 interconnecting the responder units and the instructor's apparatus contains the same nine wires leading to each responder unit; in addition there are $n$ other leads, a different one to each of the responder units, which are represented schematically as passing through a common cable 302 to the instructor's equipment shown in FIG. 10.

The portion of the instructor's apparatus utilized in the printing out of students' names will now be described with reference to FIGS. 9 and 10. When it is desired to place the apparatus in the "insert name" mode, the "Insert Name" switch 306 is operated momentarily, to supply positive B+ voltage from supply terminal 308 to "Name" latch relay 310, which is thereby set to a condition in which it supplies B+ voltage from line 312 to relay output line 314. The latter voltage is supplied over the cable line N to all of the alphabet-selector wheels in all of the responder units to render them operative. It is also supplied to "Clear" relay 318, which is normally closed but is thereby opened so that supply voltage is removed from the E/C and TR cable lines. This renders inoperative the flip-flops in the responder units, as well as the AND gates operating the "ready" lights. However, each alphabet-selector wheel is operative to produce at its five brush contact output leads a set of voltages indicative of the letter to which the student has set his wheel. These five voltages are supplied simultaneously to the corresponding five OR circuits, such as 236, in each of the responder units, and pass through the OR circuits to one input of the read-out AND gates such as 234. The instructor's equipment then operates to apply interrogating or read-out voltages to the cable lines $I_1$, $I_2$, $I_3$, $I_4$ and $I_5$ in sequence, and to repeat this sequence a number of times equal to the number of responder units, thereby to read out onto the unique lines such as $U_A$, $U_B$ and $U_n$ serial pulse-coded signals representing the positions of all of the character selector wheels, and hence representing the letters which the students have selected for recording, as will now be described.

The electric printer 328 which prints out the name records may be of any of a variety of known types for recording on any of a variety of media, but in the present example will be assumed to be a conventional teletypewriter. When operating in its steady state, it is capable of responding to a five-bit serial pulse-code signal to print any desired letter, and then to shift automatically to the next horizontal position for printing the next letter; it will be also understood that it is provided with conventional carriage-return and line-feed automatic controls so that at the end of each horizontal line of print it will return to the beginning of the next line below.

Figure 12:
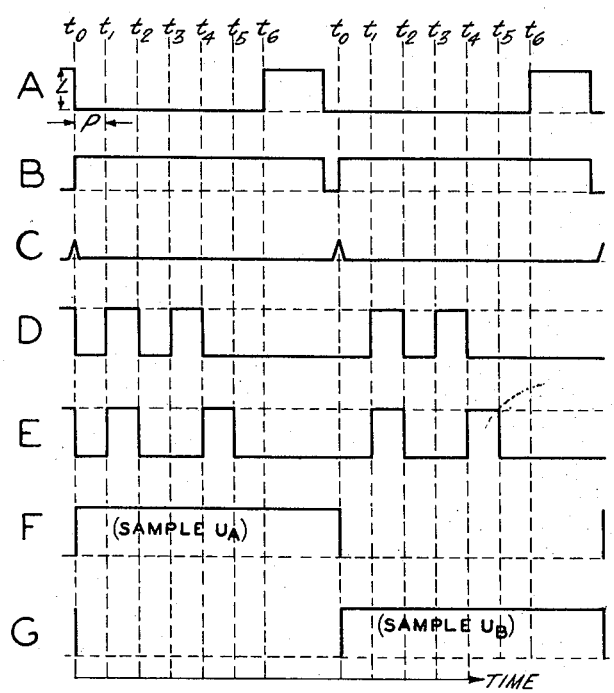
FIG. 12 is a graphical timing diagram to which reference will be made in explaining the operation of the invention, and in which ordinates represent time to a common scale for each of the waveforms A through G.

As represented at A of FIG. 12, if prior to a time $t_0$, the signal input to the printer has been maintained at a predetermined level L for a sufficient time, and then goes negative for a predetermined period P indicated as $t_0$ to $t_1$, the printer is thereby keyed into operation thereafter to print letters in response to serial code pulses occurring in intervals immediately following the times $t_1$, $t_2$, $t_3$, $t_4$ and $t_5$; from the time $t_6$ to the beginning of the next cycle, the printer digests and interprets the coded pulse information just received and, during the next cycle, prints the corresponding letter.

To provide appropriate timing signals for this operation there is employed a clock pulse generator circuit 330 which produces periodic relatively-long pulses, such as are shown at B of FIG. 12, with a periodicity equal to the letter-cycle time of the printer, which may be of the order of 100 milliseconds. The clock pulse generator circuit is operative or inoperative, depending upon the state of a flip-flop 332. To start the clock pulse generator circuit, the "Print Name" switch 334 is pressed, which operates through a relay 336 momentarily to close the switch 338, thereby momentarily connecting a control electrode of the flip-flop to ground. This sets the flip-flop in the state which permits the clock pulse generator to operate. A long-pulse detector 339 is supplied with the long clock pulses such as are shown at B of FIG. 12, and responds thereto to start internal functioning of the electric printer preparatory to actual printing. Preferably the clock pulse generator circuit also produces short timing pulses at the beginning of each long cycle, such as are shown at C of FIG. 12 for various timing purposes.

In particular, the timing pulses shown at C of FIG. 12 are applied to a ring counter circuit 342 having seven output terminals 344, 346, 348, 350, 352, 354 and 356, which produce pulses in the intervals beginning at the times $t_0$, $t_1$, $t_2$, $t_3$, $t_4$, $t_5$ and $t_6$, respectively. The pulse from the $t_0$ terminal 344 is applied to the electric printer 328 to key it into its operative state for receiving serial pulse-coded information. The outputs at terminals 346, 348, 350, 352 and 354, comprising pulses beginning at the respective times $t_1$, $t_2$, $t_3$, $t_4$ and $t_5$, are applied through respective line driver amplifiers 360, 362, 364, 366 and 368, and thence through five-pole double-throw switch 370 to the interrogate, or read-out, lines $I_1$, $I_2$, $I_3$, $I_4$ and $I_5$, respectively. The five-pole switch 370 is placed in the downward position required for this operation by a signal delivered from the "Name" latch relay 310 over a line 372 operating through a relay 374.

In this way, five sequential read-out pulses are supplied to all of the responder units at the same times during each cycle of the clock pulse generator circuit 330. Read out is thereby provided upon the unique lines in each of the responder units, for example from line $U_A$ of the unit shown at A of FIG. 9. The waveforms at D and E of FIG. 12 illustrate two such possible read-out signals, which may appear on lines $U_A$ and $U_B$, respectively. The waveform at D, for example, may indicate the presence of a voltage only at brush contact leads 210A and 206A, while the waveform at E may indicate voltages present at only brush contact leads 210B and 204B.

All of the unique lines U from the responder units are connected in the instructor's equipment to different terminals of a signal sampling device which samples them in sequence, one line during a given cycle of the clock pulse generator circuit 330, the next line during the next cycle of the clock pulse generator circuit, and so on for all of the responder unique lines. This is illustrated schematically in FIG. 10 by the connection of each of the $n$ unique lines to different contacts of a sampling switch 380 having a rotating arm 382 which contacts each of the unique leads in succession, stepping one position for each clock pulse cycle. Two such successive intervals are shown at F and G of FIG. 12, the result of which will be produce on switch arm 382 the pulse code shown at D of FIG. 12 and to produce on the latter arm during the next interval the pulse code shown at E of FIG. 12. The sampler proceeds in this manner to sample in sequence the serial pulse code signals from each of the responder units to form a single serial pulse code train on the sampler output lead 384.

While the sampling may be accomplished by a rapidly-acting mechanical switch, it is preferred to utilize known electronic sampling or commutating devices for the purpose. To provide timing for the stepping of the sampling switch, a connection is provided from the $t_6$ terminal 356 of ring counter 342, through double-throw electronic switch 390 and stepper 392 to the switch arm 382. The pulses from ring counter circuit terminal 356 are also supplied to a four-pulse counter 396, which counts the first four clock pulses produced after the generation of clock pulses first begins. Until these four pulses have been counted, the ring counter pulses pass through electronic switch 390 to output lead 398 thereof and thence to the electric printer 328, where they perform known internal functions to ready the printer for the imminent receipt of pulse coded signals. This control of the electronic switch 390 is provided over lead 400 from the four-pulse counter 396 which, after the four pulses have been counted, operates the electronic switch to the position in which it supplies the ring counter timing pulses to the stepper 392 to start the sampling operation.

The signals on sampler output lead 384 are then passed through a threshold circuit 401, which shapes and limits the pulses, and thence through the single-pole double-throw switch 402 to the pulse input of the electric printer 328, which prints out in sequence the letters of the alphabet selected by the students at the several responder units.

Just beyond the last-sampled contact 404 on the sampler 380 to which a unique line is connected, there is provided an additional reset contact 412 so that, when the switch arm 382 has sampled all of the signals and passes to contact 412, a reset pulse is applied over line 414 to flip-flop 332 to change its state and terminate operation of clock pulse generator circuit 330. The reset signal on line 414 may also be utilized to reset the four-pulse counter 396. The equipment is then in condition for repeating the above-described operation to record the next letter in each of the students' names.

It is noted, that as described previously, the instructor may insert manually a spacing between the initials and the last names of the students, and between the ends of the longest last name and the beginning of the respose records. Also, it is understood that when any given student has completed print-out of his name, he turns his alphabet selector wheel to the blank position provided between letters Z and A, so that no signal is supplied to the electric printer from his responder unit while the other students complete spelling-out of their names.

When the name printing is completed, the instructor operates the "Answer Mode" switch 420, which unlatches the "Name" latch relay 310, permits the five-pole switch 370 to return to its normal upward position in which the amplifiers 360 through 368 are disconnected from the interrogate lines $I_1$ through $I_5$, and at the same time permits "Clear" relay 318 to return to its normally-closed condition.

The equipment at this time is in its so-called "static" mode, in which the array of lamps (see FIG. 3) on the instructor's console indicates the nature of the responses from the students. This display apparatus is represented at 422 in FIG. 10, wherein three such lamps 424, 426 and 428 are shown connected between ground and unique lines $U_A$, $U_B$ and $U_n$, respectively, by way of example.

The manner in which power is supplied to the responder units during the "static" mode will now be described. A source of electrical power 500 is connected permanently to each of the right-hand set of contacts of five-pulse switch 370 by way of lines 502, 504, 506, 508 and 510, respectively. This source may typically comprise half-wave rectified 60-cycle line voltage, and is applied by switch 370 to the interrogate or read-out lines for all of the responder units. A corresponding current is returned over the individual unique lines to the corresponding lamp in the display apparatus if the student has operated any of his response switches. This causes the corresponding lamp to glow with half brightness; if the student has not made any response, the lamp is not illuminated at all.

To brighten those lamps corresponding to correct answers, an additional electrical power source 520 is connected to each of the five-pulse switch lines 502 through 510, through latching relays 524 through 532, respectively, but only when the contacts of the corresponding latching relay are closed. The source 520 may conveniently comprise the rectified other half of the sine-wave of 60-cycle line voltage. To enable the instructor to select which of the latching relays 524 through 532 is closed, the five "correct answer" buttons 540 through 548 are provided, which are operatively connected to different ones of the latching relays so that by operating the corresponding switch the instructor may cause the additional power from source 520 to be added to any given read-out line. Preferably a suitable electrical interlock (not shown) is also provided so that operation of any one of the instructor's "correct answer" switches drops out any other which may previously have been operated. It will be understood that here, as elsewhere in the system, isolation diodes (not shown) will be used where needed to isolate interconnected lines from each other.

The additional electrical power thereby provided to a particular one of the read-out lines $I_1$ through $I_5$ doubles the read-out power and causes all display lamps corresponding to the correct answer to glow at full brightness. Preferably also, an unlatching line 570 is connected from "Clear" relay 318 to each of the latching relays 524 through 532, so that when the "clear" operation is produced the instructor's previous choice of a correct answer will also be removed.

The apparatus providing other control functions in the "static" state is also shown in FIG. 10. As mentioned previously, the normally-closed "Clear" relay 318 supplies B+ operating power directly to cable line E/C and, by way of normally-closed "Hold" relay 600, to the TR cable line. Momentary operation of "Clear" relay 318 therefore clears all of the flip-flops in all of the responder units, and the student-response switch buttons are rendered inoperative during operation of the "Hold" relay 600. To keep the "Hold" relay 600 open, a latch circuit 604 is connected thereto.

The "Clear and Hold" function is therefore provided by supplying the "Clear and Hold" switch 608 with the B+ power from terminal 308, and connecting its output to both the "Clear" relay 318 and the "Hold" latch circuit 604. The "Clear and Ready" function is provided by supplying the "Clear and Ready" switch 610 with B+ voltage and connecting its output both to the "Clear" relay 318 and to an "unlatch" input of the latch circuit 604, which responds to a signal to release the "Hold" relay 600. The "hold" function is provided by a "Hold" switch 612 operatively connected to latch circuit 604, and the "ready" function is provided by the "Ready" switch 614 operatively connected to another "unlatch" input terminal of latch circuit 604 to release the "Hold" relay 600.

The other mode of operation of the apparatus is the "print answer" mode, which is initiated by operating the "Answer Mode" switch 420, then allowing the students to select their responses, and next actuating the "Print Answer" switch 640. The latter switch operates through latch relay 642 and line 644 to actuate five-pole switch 370 to its upward position in which it connects amplifiers 360 through 368 to the read-out line $I_1$ through $I_5$. It also operates, through relay 648, to switch the arm of switch 402 from contact 650 to contact 652 thereof, thereby disconnecting electric printer 328 from threshold circuit 401 and connecting it instead to the output of an encoder 658. In addition, the "Print Answer" switch acts over its output line 660 momentarily to close switch 338 and initiate automatic read out.

The resultant read-out process is similar to that described hereinbefore, and hence need not be described again in detail; it differs in that each unique line will in this case return, at most, one pulse during each clock pulse cycle, rather than a number of such pulses. The returned pulses are sampled as before by the sampler 380, and are supplied through threshold circuit 384 to the input of storage and coincidence circuit 664. The latter circuit is also supplied with the five timing pulses from terminals 346, 348, 350, 352 and 354 of ring counter circuit 342. The storage and coincidence circuit is thereby enabled to determine which flip-flop in any given responder unit has produced a response pulse. Circuits for providing this operation are well known in the art, and may for example comprise an AND circuit for each ring-counter pulse line and lines for applying the return signal from the unique lines to each of the And circuits, the flip-flop which produces the response pulse being identified by an output from a particular one of the AND circuits. Appropriate flip-flops may also be utilized to store this information during each cycle of the clock pulse.

The five lower output lines such as 665 from storage and coincidence circuit 664 connected to encoder 658 therefore supply the encoder with information as to which flip-flop is being operated in a given responder. Although not necessary in all embodiments of the invention, in this case the storage and coincidence circuit 664 also has an output line S for indicating no response from the student, for which a space on the print-out is to be provided, and an output line V which produces an output when a student response is the correct one, in which event there is no output from the other five output lines. Where this type of print-out is to be provided in which a V is printed for a correct answer instead of the actual letter A, B, C, D or E, the storage and coincidence circuit 664 is preferably also connected to the outputs of the five latching relays 524 through 532 through which the instructor's choice of a "correct answer" is inserted into the system, whereby this information is made available to the storage and coincidence circuit 664 so that the desired "V" output can be provided.

The encoder 658 is also supplied with the five timing pulses from the ring counter 342 so that it may take the information supplied to it from storage and coincidence circuit 664 and scan it, so as to produce the desired form of serial pulse-coded signal at its output line 670, which then passes through switch 402 to the electric printer 328 for print out. As in the case of the "Print Name" mode operation, the sampler reset contact 412 terminates the generation of read-out pulses at the end of the complete read-out from all responder units.

The details of the circuit outlined for producing operation in the "Print Answer" mode may take any of a large variety of forms well known in the art and hence need not be described herein detail.

The resultant print-out from the electric printer 328 is then of the form described above with reference to FIG. 2. The column of correct answers at the left of the print-out sheet may be provided by manual keyboard operation by the instructor or, if desired, can be produced automatically in response to the instructor's operation of the "correct answer" switches 540 through 548.

Various other functions may also be provided by the system, compatibly with the name-print operation. For example, additional console controls and circuitry can be provided to select for print out only the first choice of response made by each student, by sensing the first response and using it to open the TR cable line until the instructor "clears" the system for the next question and response.

There has thereby been provided a system in which each student may, by simple operation of controls at his responder unit, cause print-out of his name in a position associated with a print-out record of his responses to questions. In the particular form shown, the apparatus is not only compatible with generally desirable student-responder operations, but is economical in utilizing the same unique line and the same answer as is employed with the student response operation.

It will however be understood that the details of the circuitry employed in various applications may be quite different from that shown, and in particular may readily be adapted to utilize semiconductor devices throughout in place of relay circuits. Furthermore, the construction and operational characteristics of the portion of the student-responder apparatus used to respond to questions may be quite different from that specifically shown and described. Similarly, the apparatus used for recording names may be quite different from that shown, in many respects. For example, by using a separate line to each responder for each letter of the alphabet, letter information may be provided in parallel form, rather than serial form, and the instructor's apparatus and the electric printer may be adapted to produce proper print-out in response to such parallel data signals. The alphabet selector itself may take a great variety of different forms, as may the encoder for producing electrical signals indicative of the condition of the selector. The letters to be printed may be represented not only by time-distinguished electrical signals, or by wire-distinguished signals, but also by different frequencies of signals for the different letters. It is also possible in some cases to utilize space links in place of connecting wires between responder units and instructor's equipment, and to control the insertion of the name data by print-out controls located at the student positions, rather than by a common single print-out control at the instructor's console.

Accordingly, while the invention has been described with particular reference to a specific embodiment thereof in the interest of complete definiteness, it will be un-

What is claimed is:

1. A responder system, comprising:
   at least one student station having student-operable controls for producing signals indicative of student responses;
   recording means supplied with said response-indicating signals for producing records of said signals on a recording medium; and
   means controlled from said at least one station for producing a record on said medium of the name of a student at said station;
   said last-named means comprising character selection control means manually settable to a different condition for each character of an alphabet, means for converting each character selected by said selection into a different electrical signal, and means for transmitting said electrical signal to said recording means, said recording means being responsive to said electrical signal to record the alphabetical characters selected.

2. A student responder system, comprising:
   a plurality of student stations each having student-operable controls for producing signals indicative of student responses;
   recording means responsive to said response-indicating signals to produce records on a recording medium of names of students at said stations;
   control means at each of said student stations, each manually settable to different conditions corresponding to a different one of the characters in an alphabet, and each comprising alphabet character indicia means visibly associating each of said characters with a different one of said different conditions of said control means;
   means at each of said student stations for developing a different signal for each of said different character-associated conditions of said control means; and
   means supplied with said different signals for controlling said recording means to record the characters represented by said different signals in predetermined positions on said medium.

3. The system of claim 2, in which said different signals are in binary digital form.

4. A student-responder system, comprising:
   a plurality of student-responder units at different locations;
   control console means;
   electrically-operable alphanumeric recording means;
   connections electrically connecting said control console means to each of said student-responder units and to said recording means;
   said student-responder units each comprising response-selection controls manually settable to any of a plurality of conditions thereby to indicate the selected response;
   said control console means comprising manually-operable interrogation and recording controls actuatable to read out the selected responses at said student-response units and to produce a separate record at said recording means of the selected response from each of said student-responder units;
   said student-responder units each comprising also a character-selecting control settable to a predetermined different condition for each of the letters of an alphabet; and
   manually-operable name-reading controls actuatable to read out the condition of each of said character-selecting controls and to produce records of the corresponding selected characters at said recording means, each adjacent the record of selected responses from the same student-responder unit.

5. The system of claim 4, in which said name-reading controls are located at said control console means and connected to each of said student-responder units.

6. A student-responder system, comprising:
   a plurality of student-responder units at different locations, each comprising a plurality of manually-operable bistable devices, a plurality of coincidence devices each supplied at one input terminal thereof from a different one of said bistable devices to produce a state-indicating signal at the output connection of said coincidence device when the associated bistable device is operated and a read-out signal is simultaneously applied to a second input terminal of said coincidence device, and a common read-out line in each of said student-responder units interconnecting said output connections of said coincidence devices therein;
   electrically-operable alphanumeric recording means remote from said student-responder units;
   controlledly-actuatable sequencing means for applying a read-out signal sequentially to said second terminals of said coincidence devices in each of said student-responders to produce pulses on each of said read-out lines indicative of the states of the bistable devices in the corresponding student-responder unit;
   recording means coordinated with said sequencing means, and means connecting said recording means with each of said read-out lines, said recording means being responsive to said pulses on said read-out lines to record the states of said bistable devices;
   each of said student responder units also comprising character-selection control means manually settable to a different condition for each character of an alphabet, digital encoding means for encoding said different conditions to produce a parallel binary digital signal representing said conditions at a number of terminals no greater than the number of said coincidence devices in each of said student-responder units, and means for connecting each of said terminals to a different one of said coincidence circuits at said first terminal thereof to operate it when said read-out signal is also present thereon; and
   means for controlledly blocking and unblocking application of said binary signals to said coincidence devices, whereby actuation of said scanning means while said application of said binary signals is unblocked produces, on said read-out lines, character-representing pulses representative of the conditions of said character-selection control means;
   said recording means being responsive to said character-representing pulses on said read-out lines to produce records of the corresponding conditions of said character-selection control means, whereby records of the names of each student are provided by operation of said character-selection means of said student-responder units.

References Cited

UNITED STATES PATENTS

| | | | |
|---|---|---|---|
| 3,266,174 | 8/1966 | Bechtol et al. | 35—11 |
| 3,269,033 | 8/1966 | Redfield et al. | 35—35 |
| 3,300,876 | 1/1967 | Johannsen | 35—9 |
| 3,314,172 | 4/1967 | Boyett | 35—48 |

EUGENE R. CAPOZIO, Primary Examiner

J. H. WOLFF, Assistant Examiner